July 13, 1937.   F. H. SHEPARD, JR   2,086,965
ELECTRICAL MEASURING DEVICE
Filed May 16, 1936

INVENTOR
FRANCIS H. SHEPARD, JR.
BY
Charles McClair
ATTORNEY

Patented July 13, 1937

2,086,965

UNITED STATES PATENT OFFICE 2,086,965

ELECTRICAL MEASURING DEVICE

Francis H. Shepard, Jr., Rutherford, N. J., assignor, by mesne assignments, to Radio Corporation of America, New York, N. Y., a corporation of Delaware Application May 16, 1936, Serial No. 80,135

5 Claims. (Cl. 175—183)

This invention relates to current measuring devices, particularly to means for measuring extremely small values of current in high impedance circuits.

Instruments for testing high impedance circuits carrying small currents usually comprise a thermionic relay and a milliammeter connected in the output of the relay with the input electrodes of the relay usually connected across the high impedance to be tested. When the impedance has a value of the order of several megohms, leakage resistances between parts of the circuit of the instrument become comparable to the impedance under test and variation of supply voltages or tube and circuit characteristics appreciably effect the calibration of the instrument.

It is an object of my invention to provide a current measuring device adapted to measure extremely high impedances and small currents and which is insensitive to substantial changes in circuit constants in the device.

It is a further object of my invention to provide a current measuring device which is relatively insensitive to substantial changes in current supply voltages or tube characteristics.

Figure 1:
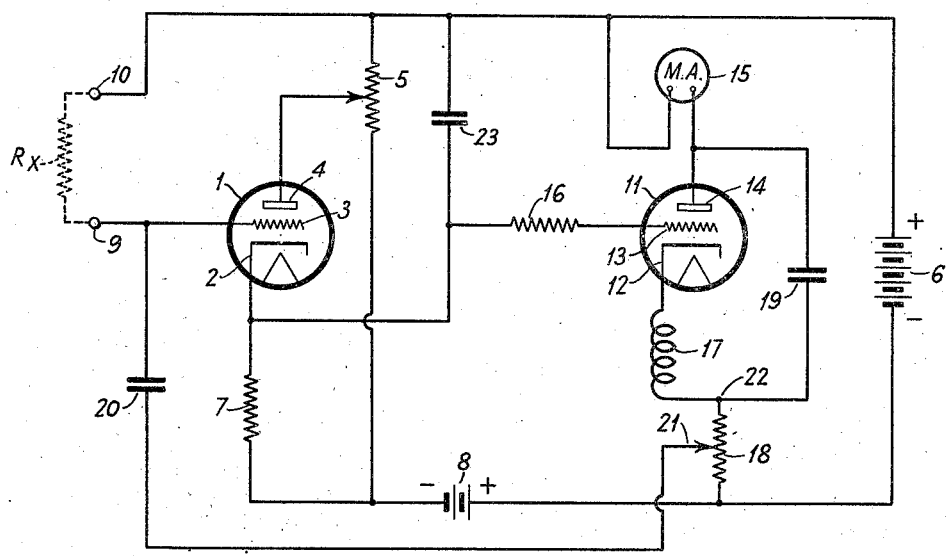
Figure 2:
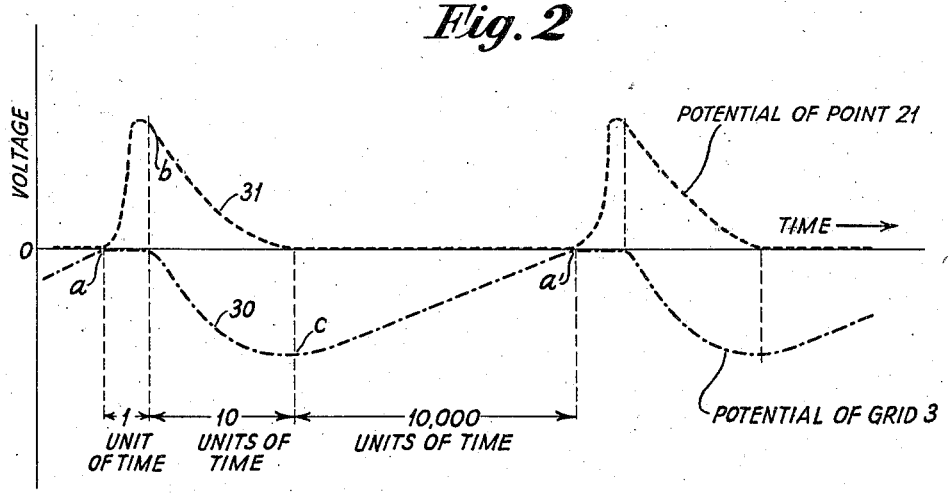

My invention is specifically defined in the appended claims and one embodiment is described in the following specification in connection with the accompanying drawing in which:

Figure 1 shows schematically the circuits of one embodiment of my invention, and Figure 2 shows a group of curves explanatory of the operation of my device.

The current measuring device, according to one embodiment of my invention and as shown in Figure 1, comprises a thermionic relay tube such as a highly evacuated electron discharge device 1, with cathode 2, grid 3 and anode 4, with the anode connected through the sliding contact of potentiometer 5 to the positive end of the voltage source 6, and with cathode 2 connected to the negative end of the voltage source 6 through a coupling or loading resistor 7, and battery 8. The potential of grid 3 controls the current flowing in the anode-cathode space of the tube and through resistor 7 and may accordingly control the voltage drop across resistor 7. The potential of grid 3 is, according to my invention, controlled by the value of an impedance to be tested such as resistance $R_x$, which is connected at one end to one input or test terminal 9, the other end of the impedance being connected to the other test terminal 10 which may be connected to any point of a potential equal to or higher than the potential of cathode 2 and may conveniently be connected to the positive end of voltage source 6.

To obtain an indication of the voltage drop across resistance 7, I prefer to use a grid controlled gaseous discharge tube, such as a gas triode 11 with cathode 12, grid 13 and anode 14, with the anode connected through a current meter 15, such as a milliammeter, to the voltage source 6 and with the grid and cathode connected respectively to opposite ends of resistor 7, a ballast or current limiting resistor 16 being connected in series with the grid, and inductance 17 and potentiometer 18 being connected in series with the cathode. Condenser 19 in series with inductance 17 is connected between the anode and cathode of the gas discharge device, so that discharges in the gas tube cause transient current to flow through inductance 17 and condenser 19 and produce transient changes in voltage at point 22. Corresponding voltage change of contact 21 on the potentiometer may be impressed upon grid 3 of the electron discharge device through condenser 20.

When the circuits of the device are energized, and terminals 9 and 10 are open circuited grid 3 is "free" and will assume a negative charge sufficient to reduce the space current of the discharge device 1 to zero or some low value. The potential of grid 3 becomes sufficiently positive to cause appreciable space current flows through the tube and resistor 7 when the resistance $R_x$ is connected between terminals 9 and 10, and the upper end of resistor 7 becomes positive. Grid 13 of the gas triode tube may thus be made sufficiently positive to ignite or start a gaseous discharge between the anode and cathode of the gas tube. Upon the ignition of the gaseous discharge the energy stored in condenser 19 by the battery 6 discharges through the gas tube and the series inductance 17 thereby swinging point 22 at the upper end of the potentiometer sharply positive. The sudden rise of potential also makes contact 21 positive, thus impressing upon the lower plate of condenser 20 a positive charge and drives grid 3 of relay 1 to a potential at which a considerable flow of negative electrons is drawn to the grid, but only continues while contact 21 is rising in potential. As the potential of the contact 21 decreases from its maximum positive value the potential of grid 3 also decreases and the grid assumes a negative charge proportional to the decrease of voltage of the contact, the potential of the cathode 2 being held substantially constant by condenser 23. This controlling action of grid 3 by the potential of contact 21 appears to be due to the fact that grid 3 is coupled to the contact only through series condenser 20 and that grid 3 responds only to dynamic changes of potential at 21 and is independent of the absolute voltage at 21, or of contact potential differences between grid 3 and cathode. As grid 3 of the electron discharge device swings negative, the plate current through tube 1 and the voltage across resistor 7 drops to such a value that grid 13 regains control of the gas discharge tube and interrupts the gas discharge.

The time required for the negative charge upon grid 3 to leak off through impedance $R_x$ depends upon the value of $R_x$, and the D. C. voltage across $R_x$, and accordingly determines the time required for plate current through tube 1 and resistor 7 to return to such a value as to re-ignite a second or another gaseous discharge in gas tube 11. The current meter 15 in the anode-cathode circuit of the gas tube integrates the pulses of current caused by the succession of gaseous discharges and hence gives an indication of the value of $R_x$.

The sequence of operations in my improved current measuring device may be graphically represented by the group of voltage vs. time curves shown in Figure 2, in which the potential of cathode 2 at the instant the gas tube is ignited has arbitrarily been selected as the zero or reference potential, and curve 30 has been plotted to indicate voltage variations of grid 3 of the relay tube and curve 31 plotted to indicate voltage variations of contact 21 throughout two cycles of operation. With the anode potential of tube 1 properly adjusted by the sliding contact of potentiometer 5 and with the value of resistance 7 so selected that the gas tube is ignited at the potential at which grid 3 just starts to draw negative electrons, commonly called grid current, a rise of control grid voltage 3 to point $a$ immediately ignites the gas tube, swinging the potential of contact 21 to some high value $b$. The sudden rise of voltage of contact 21 from $a$ to $b$ urges the control grid 3, through condenser 20, toward a positive value, but due to the flow of negative electrons to the grid the grid potential continues during this transitory state at substantially cathode or zero potential, and the collapse of the potential of contact 21 to zero draws grid 3 to a negative potential with respect to cathode proportional to the potential change of contact 21, modified by grid-to-ground capacity, indicated at $c$. Current flow through $R_x$ proceeds to raise the potential of grid 3 from $c$ to point $a'$, whereupon the gas tube is re-ignited and the cycle of operations is repeated. In normal operation, the time required for the discharge of tube 11 and condenser 19, ($a$ to $c$) is only a small fraction of the time required to relieve the negative charge upon grid 3 ($c$ to $a'$). Since the time from $a$ to $b$ requires, say, one unit of time, from $b$ to $c$ ten units of time, and from $c$ to $a'$ 10,000 units of time, the time axis of the curves has been distorted to more clearly show in the curves the operating conditions in the circuits.

Such variations in tube capacities as grid-to-cathode and grid-to-plate have substantially no effect upon the calibration of my device inasmuch as the potential of grid 3 remains essentially unchanged during the part of the cycle $a$ to $b$ in which condenser 20 is charged. A given change in potential of point 21 results in a given quantity of electricity being fed into condenser 20. This quantity or charge of electricity fed into condenser 20 distributes itself, as the potential of point 21 drops to zero ($c$), among the capacities between the grid and grounded parts of the circuit and tube. Whether the tube capacities are large or small, this quantity of electricity fed into the grid parts is fixed only by the swing of contact 21 and size of condenser 20 and requires a definite interval of time to relieve that charge through $R_x$. The frequency of relaxation further has been found to be little affected by changes in power supply voltages.

Practically all of the time the negative charge on the grid is being dissipated through resistor $R_x$ the plate current of tube 1 is zero, which means that no current due to residual gas in tube 1 may flow to the grid during this time. Further, to minimize thermionic space current to the grid from the heater, the heater temperature may be lowered, and the heater maintained at a potential positive with respect to the grid. Good results have been obtained by using for tubes 1 and 11 tube types commercially known as the 2A6 and the 885 and with condensers 19 and 20 respectively of about .1 micro-farad and 1 micro-micro-farad, and with resistors 5, 7, 16 and 18 respectively 20,000 ohms, 100,000 ohms, 250,000 ohms, and 10,000 ohms, and with inductance 17, 8 milli-henries. A circuit thus constructed has been found useful in measuring small phototube currents, resistance leakage currents in insulators, and other minute currents in high impedance circuits. My device may conveniently be employed in measuring the leakage resistance of condensers by open circuiting terminals 9 and 10 and connecting the condensers to be tested in place of condenser 20, in which case meter 15 may be calibrated directly in units of resistance per unit of capacity.

While I have indicated one preferred embodiment of my invention, it will be apparent to those skilled in the art that my invention is by no means limited to the exact form illustrated, but that many variations may be made in the particular structure and connections used and the purpose for which it is employed without departing from the scope of my invention as set forth in the appended claims.

I claim:

1. A current measuring device comprising an electron discharge device with an anode, a grid, and a cathode, the anode and cathode being connected in series with a resistance through an anode voltage source, a current meter, a resistor, a grid controlled gas discharge tube with its anode and cathode connected in series with said meter and said resistor across said source, the grid and cathode of said gas tube connected respectively to spaced points on said resistance, a condenser connected between the first-mentioned grid and an intermediate point on said resistor, and means for changing the potential of the first-mentioned grid.

2. A current measuring device comprising an electron discharge tube with an anode, a grid, and a cathode, a coupling impedance in series with a voltage source connected across said anode and said cathode, two input test terminals, a condenser, the grid of the tube being connected to one of said test terminals and to one plate of said condenser, a gas discharge device with control grid and cathode coupled across said impedance, means for impressing the transitory voltage, caused by gaseous discharges, on the grid of said tube including a connection from the other plate of said condenser to the output circuit of the gas discharge device and means in circuit with said gas discharge device for indicating the frequency of gaseous discharges.

3. In combination, an electron discharge tube with an anode, a grid, and a cathode, a voltage source and a coupling impedance connected in the output circuit of said tube, means responsive to current changes in said impedance and coupled to said grid through a condenser to impress periodical negative charges on said grid, means to remove said charges on the grid comprising two test terminals, one terminal being connected to said grid and the other terminal being connected to a point of a potential equal to or higher than the potential of said cathode and means responsive to current in said impedance to indicate the periodicity of the negative charges on the grid.

4. The combination of an electron discharge device with a control element and a resistor in its output circuit, a gas triode with a control grid and having an inductance and capacity in series in the ouput circuit of the triode, a connection between the grid of said triode and a first point on said resistor, a connection between the cathode of the triode and a second point on said resistor more negative than said first point, a condenser connected between the output circuit of said triode and the control element of said device, and one test terminal connected to the control element of said device and another test terminal connected to a point in the output circuit of said discharge device.

5. In combination an electron discharge device with a control element and a resistor in the output circuit of said device, a gas triode with a control grid and an oscillatory circuit connected in the output of said triode, connections from the cathode and control grid of said triode to spaced points on said resistor, a condenser connected between the said oscillatory circuit and the control element of said device, and means to connect an impedance to be tested between the control element of said discharge device and a point in said output circuit.

FRANCIS H. SHEPARD, JR.